US008962749B2

(12) United States Patent
Kimura et al.

(10) Patent No.: US 8,962,749 B2
(45) Date of Patent: Feb. 24, 2015

(54) CERAMIC GREEN SHEET AND METHOD FOR PRODUCING THE SAME

(75) Inventors: Koji Kimura, Nagoya (JP); Takuji Kimura, Kariya (JP); Tetsuya Onogi, Nagoya (JP); Hidemi Nakagawa, Aichi (JP)

(73) Assignee: NGK Insulators, Ltd., Nagoya (JP)

( * ) Notice: Subject to any disclaimer, the term of this patent is extended or adjusted under 35 U.S.C. 154(b) by 533 days.

(21) Appl. No.: 12/366,715

(22) Filed: Feb. 6, 2009

(65) Prior Publication Data

US 2009/0209700 A1    Aug. 20, 2009

(30) Foreign Application Priority Data

Feb. 19, 2008    (JP) .................................. 2008-037157

(51) Int. Cl.
*C09K 3/00*    (2006.01)
*C04B 33/00*    (2006.01)
(Continued)

(52) U.S. Cl.
CPC ............ *C08G 18/1825* (2013.01); *C04B 26/16* (2013.01); *C08G 18/6212* (2013.01);
(Continued)

(58) Field of Classification Search
CPC ........... C08G 18/1825; C08G 18/7671; C08G 18/6212; C04B 35/111; C04B 35/4682; C04B 35/63456; C04B 35/486; C04B 35/565; C04B 35/584; C04B 26/16; C04B 2235/6025
USPC ......... 428/210, 292, 325, 339, 480, 688, 540, 428/542.8, 292.1; 439/935; 623/23.56; 449/31; 48/34.1, 34.4; 501/141, 146, 501/148; 524/590; 252/182.2, 182.21, 252/182.22, 182.23
See application file for complete search history.

(56) References Cited

U.S. PATENT DOCUMENTS 4,353,958 A    10/1982 Kita et al.
4,452,905 A *    6/1984 Drinkuth et al. ................. 501/81
(Continued)

FOREIGN PATENT DOCUMENTS

DE    196 15 400 A1    10/1997
DE    19615400    * 10/1997 ............ C04B 35/634
(Continued)

OTHER PUBLICATIONS

Green (Aluminum Recycling and Processing, ASM International Materials Park OH USA, 2007).*
(Continued)

*Primary Examiner* — Patrick Ryan
*Assistant Examiner* — Aaron Greso
(74) *Attorney, Agent, or Firm* — Burr & Brown, PLLC

(57) ABSTRACT

The invention provides a ceramic green sheet having plasticity, punching property, and sinterability of satisfactory levels as well as a low percent (heat) shrinkage. In the production of a ceramic slurry serving as a raw material of the sheet, ingredients thereof are mixed under such conditions that the functional group ratio (polyol to isocyanate) is 1.5/11.5 to 11.5/11.5; the urethane resin formed from isocyanate and polyol has a repeating-unit-based molecular weight of 290 to 988; and the ratio by weight of the urethane resin to a ceramic powder falls within a range of 4.5 to 10 parts by weight of the urethane resin with respect to 100 parts by weight of the ceramic powder. A ceramic green sheet having, in well balance, all of the properties (i.e., plasticity, punching property, sinterability, and (heat) shrinkage) required for facilitating subsequent processes such as mechanical working and firing can be provided.

8 Claims, 3 Drawing Sheets

(51) Int. Cl.

| | | |
|---|---|---|
| *A01K 47/00* | (2006.01) | |
| *A61F 2/28* | (2006.01) | |
| *B32B 3/00* | (2006.01) | |
| *B32B 7/00* | (2006.01) | |
| *B32B 17/00* | (2006.01) | |
| *B32B 18/00* | (2006.01) | |
| *D04H 1/00* | (2006.01) | |
| *D04H 3/00* | (2012.01) | |
| *D04H 5/00* | (2012.01) | |
| *C08G 18/18* | (2006.01) | |
| *C04B 26/16* | (2006.01) | |
| *C08G 18/62* | (2006.01) | |
| *C08G 18/76* | (2006.01) | |
| *C04B 35/111* | (2006.01) | |
| *C04B 35/468* | (2006.01) | |
| *C04B 35/486* | (2006.01) | |
| *C04B 35/565* | (2006.01) | |
| *C04B 35/584* | (2006.01) | |
| *C04B 35/634* | (2006.01) | |

(52) U.S. Cl.
CPC .......... *C08G18/7671* (2013.01); *C04B 35/111* (2013.01); *C04B 35/4682* (2013.01); *C04B 35/486* (2013.01); *C04B 35/565* (2013.01); *C04B 35/584* (2013.01); *C04B 35/63456* (2013.01); *C04B 2235/6025* (2013.01)
USPC ...... 524/590; 428/540; 428/542.8; 428/292.1; 428/210; 428/325; 428/339; 428/480; 428/688; 623/23.56; 449/31; 501/141; 501/146; 501/148; 252/182.2; 252/182.21; 252/182.22; 252/182.23; 252/182.24

(56) References Cited

U.S. PATENT DOCUMENTS

| | | | |
|---|---|---|---|
| 4,507,465 A * | 3/1985 | Chiba et al. ................... | 528/312 |
| 5,733,499 A | 3/1998 | Takeuchi et al. | |
| 5,753,160 A | 5/1998 | Takeuchi et al. | |
| 5,955,392 A | 9/1999 | Takeuchi et al. | |
| 6,051,171 A | 4/2000 | Takeuchi et al. | |
| 6,191,212 B1 * | 2/2001 | Kube ........................... | 524/590 |
| 6,395,117 B1 | 5/2002 | Takeuchi et al. | |
| 6,521,686 B1 | 2/2003 | Erny | |
| 6,797,799 B1 * | 9/2004 | Slack et al. ..................... | 528/60 |
| 2002/0045724 A1 | 4/2002 | Tsuruta et al. | |
| 2002/0055571 A1 | 5/2002 | Hirano et al. | |
| 2002/0122924 A1 * | 9/2002 | Yoshikawa et al. ........... | 428/210 |
| 2006/0036045 A1 * | 2/2006 | Wilson et al. ................. | 525/452 |
| 2008/0139777 A1 * | 6/2008 | Adkins et al. .................. | 528/67 |
| 2008/0262261 A1 * | 10/2008 | Slack et al. .................... | 560/335 |
| 2009/0035538 A1 * | 2/2009 | Namerikawa et al. ........ | 428/201 |

FOREIGN PATENT DOCUMENTS

| | | | | |
|---|---|---|---|---|
| JP | 56-110717 | * | 9/1981 | ............ C08G 18/80 |
| JP | 02-267175 A1 | | 10/1990 | |
| JP | 02-307861 A1 | | 12/1990 | |
| JP | 07-069739 A1 | | 3/1995 | |
| JP | 11-171651 A1 | | 6/1999 | |
| JP | H11-171651 | * | 6/1999 | |
| JP | 11-322442 A1 | | 11/1999 | |
| JP | H11 322442 | * | 11/1999 | ............ C04B 35/622 |
| JP | 2001-335371 A1 | | 12/2001 | |
| JP | 2002-255655 A1 | | 9/2002 | |
| JP | 2002-255657 A1 | | 9/2002 | |
| JP | 2002-371246 | * | 12/2002 | ............ C09D 201/06 |
| JP | 2003-171522 | * | 6/2003 | ............. C08L 29/04 |
| JP | 2003-246677 A1 | | 9/2003 | |
| JP | 2004-269308 A1 | | 9/2004 | |
| JP | 2005-193573 A1 | | 7/2005 | |
| JP | 2006-121012 A1 | | 5/2006 | |
| WO | WO 92/07015 | * | 4/1992 | ............ C08G 18/10 |

OTHER PUBLICATIONS

ChemEurope (Toluene diisocyanate data sheet (C) 1997).*
J. T. Baker (Polyethylene glycol MSDS).*
Scifinder (Propylene Glycol Property sources printed Oct. 18, 2011).*
Streicher et al. American Industrial Hygiene Association Journal vol. 57 pp. 905-913, 1996.*
Otey et al. (Journal of Applied Polymer Science 1964 vol. 8 pp. 1985-1989).*
Li Ceramic Membranes for Separation and Reaction Wiley Hong Kong C 2007 British Library p. 103.*
U.S. Appl. No. 12/544,424, filed Aug. 20, 2009, Kimura et al.
Extended European Search Report dated Sep. 27, 2012.

* cited by examiner

Isocyanate molecule　　　　　　　　Polyol molecule
Molecular weight: Mi　　　　　　　　Molecular weight: Mp
Content: Ri　　　　　　　　　　　　Content: Rp Reaction Urethane resin molecule Repeating-unit-based molecular weight $Mu = \dfrac{Mi}{Ri} + \dfrac{Mp}{Rp}$

CERAMIC GREEN SHEET AND METHOD FOR PRODUCING THE SAME

BACKGROUND OF THE INVENTION

1. Field of the Invention

The present invention relates to a thin ceramic green sheet and to a method for producing the same and, more particular, to a ceramic green sheet containing a urethane resin (polyurethane) and a method for producing the same.

2. Background Art

Hitherto, there have widely been known methods in which a plurality of ceramic green sheets each containing a ceramic powder and an organic binder are formed and subjected to processes such as mechanical working, printing, stacking, and firing, to thereby produce a variety of finished products. Japanese Patent Application Laid-Open (kokai) No. 2006-121012 discloses such a method.

Conventionally, ceramic green sheets are generally produced by the following technique. First, a ceramic powder is mixed with a solvent, a dispersion medium, and an organic binder, thereby preparing a ceramic slurry, and the ceramic slurry is molded into a thin sheet through, for example, the doctor blade method. The thin molded product is dried to evaporate the solvent, thereby producing a thin ceramic green sheet. The produced green sheet has a residual solvent content of less than 1%.

As shown in FIG. 3, in the thus-produced ceramic green sheet, the intermolecular distances between organic binder molecules tend to decrease with the progress of evaporation of the remaining solvent during a process which involves heating. Thus, the ceramic green sheet has a problem of tendency to easily (heat)-shrink; i.e., exhibits a large percent (heat) shrinkage.

With ceramic green sheets exhibiting a large percent (heat) shrinkage, high positioning accuracy is difficult to obtain, in the cases of, for example, printing or drying of ceramic green sheets and stacking of a plurality of ceramic green sheets. Thus, there is demand for reduction of heat-induced percent shrinkage of ceramic green sheets.

Furthermore, in order to facilitate subsequent processes such as mechanical working and firing, ceramic green sheets are required to satisfy plasticity (i.e., cracking resistance to bending), punching property (i.e., resistance to cracking in a section formed by punching), and sinterability (ease of dense sintering). Therefore, provision of a ceramic green sheet having plasticity, punching property, and sinterability of satisfactory levels as well as a low percent (heat) shrinkage is desired.

SUMMARY OF THE INVENTION

Thus, an object of the present invention is to provide a ceramic green sheet having satisfactory plasticity, punching property, and sinterability and a low percent (heat) shrinkage.

In the present invention for attaining the object, there is provided a thin ceramic green sheet comprising, in specific amounts, a ceramic powder and a specific urethane resin (polyurethane) produced by mixing an isocyanate and a polyol and serving as an (organic) binder.

The ceramic green sheet of the invention is produced through the following procedure. First, a ceramic powder, an isocyanate, a polyol, and a solvent are mixed to prepare a ceramic slurry. The "as-prepared" slurry contains the ceramic powder, an unreacted portion of the isocyanate, an unreacted portion of the polyol, a urethane resin serving as a binder formed through reaction between the isocyanate and the polyol, and the solvent. The ceramic slurry is molded into thin sheets. Note that the slurry may contain a blocking agent for suppressing curing reaction between the isocyanate and the polyol, or the isocyanate contained in the slurry may have a blocking function. The molded products are solidified and dried to thereby evaporate the solvent, whereby thin ceramic green sheets are produced. In the solidification-drying step, solidification and drying of the molded products may be performed by heating the products or by allowing the products to stand at ambient temperature.

Thus, when a urethane resin is employed as an organic binder, the ceramic slurry (thinly molded product) is gelled and solidified in the solidification-drying step, whereby a ceramic green sheet is produced. With the progress of gelling, crosslinking can occur between adjacent molecules of the urethane resin, so that the urethane groups contained in adjacent molecules of the urethane resin are linked.

Through crosslinking, a strong network is provided among the molecules of the urethane resin. As a result, even though the solvent is evaporated, reduction in intermolecular distances between the urethane resin molecules (organic binder molecules) is suppressed. Accordingly, (heat) shrinkage of the ceramic green sheet is suppressed [i.e., percent (heat) shrinkage of the sheet decreases]. From another aspect, formation of the network serves to enhance punching property, but reduces plasticity.

The present inventors have carried out extensive studies, and have found that a ceramic green sheet having excellent properties in terms of plasticity, punching property, and sinterability, and also exhibiting a low percent (heat) shrinkage can be provided when the following conditions are satisfied: the functional-group ratio of the polyol to the isocyanate (i.e., a mole ratio of hydroxyl group to isocyanate group) which are employed for mixing falls within a range of 2/11.5 to 5/11.5; the molecular weight of the urethane resin, which is defined as the sum of a value obtained by dividing the molecular weight of an isocyanate group by the isocyanate group content of the isocyanate employed for mixing and a value obtained by dividing the molecular weight of a hydroxyl group by the hydroxyl group content of the polyol employed for mixing, falls within a range of 290 to 988; and the ratio by weight of the urethane resin to the ceramic powder contained in the ceramic green sheet falls within a range of 7 to 10 parts by weight of the urethane resin based on 100 parts by weight of the ceramic powder.

Furthermore, according to studies after an improvement of experimental circumstances, the present inventors have found that a ceramic green sheet having excellent properties in terms of plasticity, punching property, and sinterability, and also exhibiting a low percent (heat) shrinkage can be provided when the following conditions are satisfied: the functional-group ratio of the polyol to the isocyanate falls within a range of 1.5/11.5 to 11.5/11.5; the molecular weight of the urethane resin falls within a range of 290 to 988; and the ratio by weight of the urethane resin to the ceramic powder falls within a range of 4.5 to 10 parts by weight of the urethane resin based on 100 parts by weight of the ceramic powder.

In other words, through adjusting, to fall within the aforementioned ranges, the functional-group ratio of the polyol to the isocyanate which are employed for mixing, the above-defined molecular weight of the urethane resin, and the ratio by weight of the polyurethane resin to the ceramic powder contained in the ceramic green sheet, there can be prepared a ceramic green sheet meeting all the properties required for facilitating subsequent treatments of the ceramic green sheet.

DETAILED DESCRIPTION OF PREFERRED EMBODIMENTS

Hereinafter, an embodiment of the method for producing a ceramic green sheet according to the present invention will be described with reference to the drawings.

In this embodiment, the ceramic green sheet is generally produced through the following procedure.

Step 1: adding a solvent and a dispersant to a ceramic powder with mixing, to thereby prepare a ceramic slurry precursor;

Step 2: adding a polyol, an isocyanate, and a catalyst to the ceramic slurry precursor prepared in step 1 with mixing, to thereby prepare a ceramic slurry;

Step 3: molding the ceramic slurry prepared in step 2 into a thin sheet; and

Step 4: solidifying and drying the molded product (thin sheet) prepared in step 3, to thereby form a urethane resin, and evaporating the solvent off the molded product.

Through the above procedure, a ceramic green sheet is produced. As described above, the solvent, the dispersant, the isocyanate and polyol (which form urethane resin via urethane reaction), and the catalyst for accelerating urethane reaction are added as organic ingredients of the ceramic slurry. These organic ingredients impart plasticity and shape retainability to a ceramic material, which is a material having no plasticity, and are decomposed and removed through sintering (firing), thereby not remaining in a sintered product (final product). The respective steps will next be described in more detail.

Details of Step 1:

The ceramic powder may be formed of an oxide ceramic material or a non-oxide ceramic material. Examples of such ceramic materials include alumina ($Al_2O_3$), zirconia ($ZrO_2$), barium titanate ($BaTiO_3$), silicon nitride ($Si_3N_4$), and silicon carbide (SiC). These materials may be used singly or in combination of two or more species. No particular limitation is imposed on the particle size of the ceramic material, so long as a slurry can be prepared from the ceramic material.

No particular limitation is imposed on the species of solvent, so long as the solvent can dissolve the aforementioned dispersant, isocyanate, polyol, and catalyst. For example, solvent species each having two or more ester bonds such as esters of polybasic acids (e.g., dimethyl glutarate) and acid esters of polyhydric alcohols (e.g., triacetin) are preferably employed.

Examples of preferably employed dispersants include polycarboxylic acid copolymers and polycarboxylic acid salts. Through addition of such a dispersant, the slurry before molding has lowered viscosity and increased fluidity.

As described above, the ceramic slurry precursor is prepared by adding the solvent and the dispersant to the ceramic powder at predetermined proportions, and mixing and grinding them for a predetermined period of time.

Figure 1:
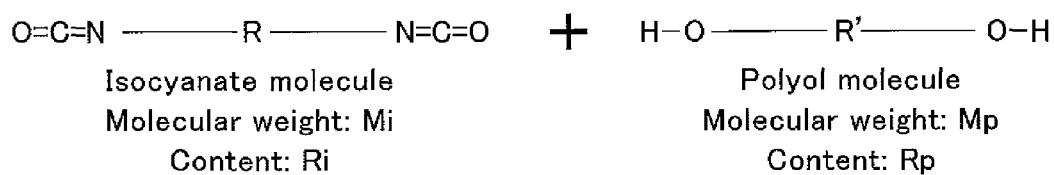
FIG. 1 schematically illustrates the repeating-unit-based molecular weight of a molecule of a urethane-resin serving as an organic binder in a ceramic green sheet according to an embodiment of the present invention.
Figure 1:
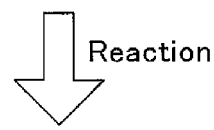
Figure 1:
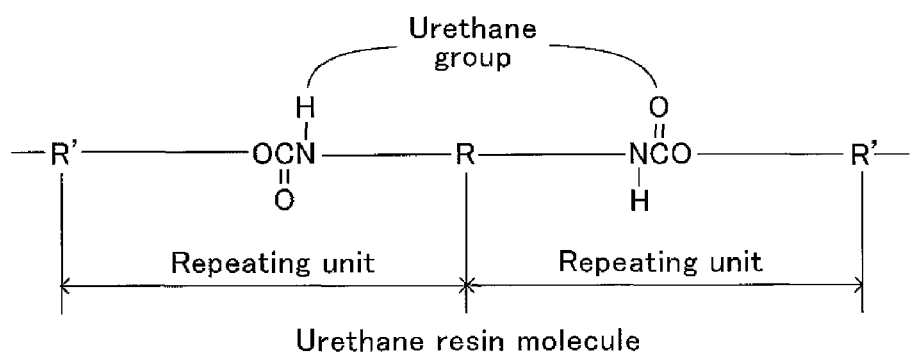

Details of Step 2:

As shown in FIG. 1, after molding of the slurry, the isocyanate and the polyol contained in the slurry undergo urethane reaction, to thereby produce a urethane resin (polyurethane) serving as an organic binder. No particular limitation is imposed on the species of isocyanate, so long as the substance has an isocyanate group serving as a functional group. Examples of the substance include tolylene diisocyanate (TDI), diphenylmethane diisocyanate (MDI), and modified products thereof. A reactive functional group other than isocyanate group may be contained in the molecule of each substance. Furthermore, a plurality of reactive functional groups may be contained in the molecule of each substance as in the case of polyisocyanates.

No particular limitation is imposed on the species of polyol, so long as the polyol has a functional group reactive with an isocyanate group; such as a hydroxyl group or an amino group. Examples of the polyol include ethylene glycol (EG), polyethylene glycol (PEG), propylene glycol (PG), polypropylene glycol (PPG), polytetramethylene glycol (PTMG), polyhexamethylene glycol (PHMG), and polyvinyl butyral (PVB).

No particular limitation is imposed on the species of catalyst, so long as the catalyst is capable of accelerating urethane reaction. Examples of the catalyst include triethylenediamine, hexanediamine, and 6-dimetylamino-1-hexanol.

As described above, the isocyanate, the polyol, and the catalyst are added to the ceramic slurry precursor, followed by mixing and degassed in vacuum, whereby a ceramic slurry is prepared.

Details of Step 3:

The above-described ceramic slurry is molded into a thin sheet through a known technique. For example, the ceramic slurry is molded into a thin sheet having a thickness of 200 μm, by a sheet-molding machine employing a doctor blade.

Details of Step 4:

The above-described sheet (molded product) is heated and/or left to stand at ambient temperature for solidification and drying. The solidification and drying of the sheet may be performed by heating the sheet inside the sheet-molding machine, or may be performed indoors at ambient temperature. Alternatively, the sheet may be solidified and dried by heating and subsequently allowed to stand at ambient temperature. By solidification and drying, solvent is evaporated off the sheet (molded product), while the ceramic slurry (sheet) is gelled and solidified via urethane reaction, whereby a ceramic green sheet (final product) is produced. Organic ingredients (e.g., urethane resin) remaining in the ceramic green sheet are removed from the sheet via decomposition, evaporation, etc., during subsequent sintering.

Figure 2A:
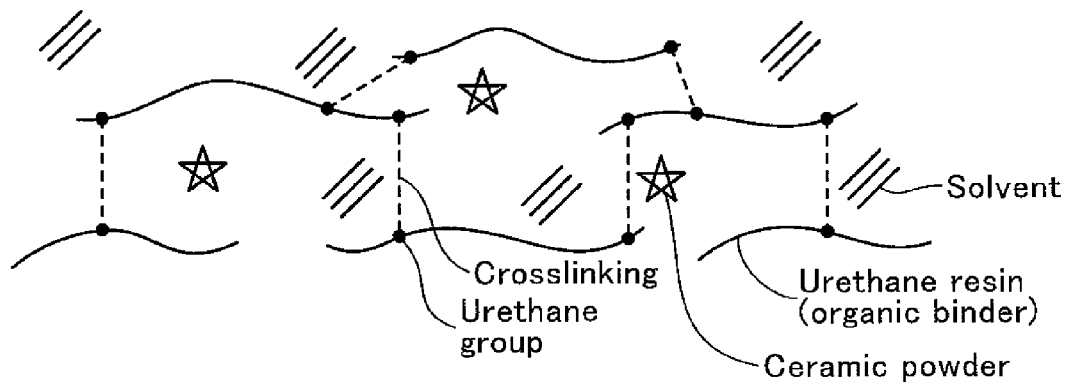
FIGS. 2A and 2B are diagrams showing the status of crosslinking attained by use of a urethane resin as an organic binder in the ceramic green sheet according to the embodiment of the present invention, before heating (i.e., before evaporation of residual solvent) and that after heating (i.e., after evaporation), respectively.
Figure 2B:
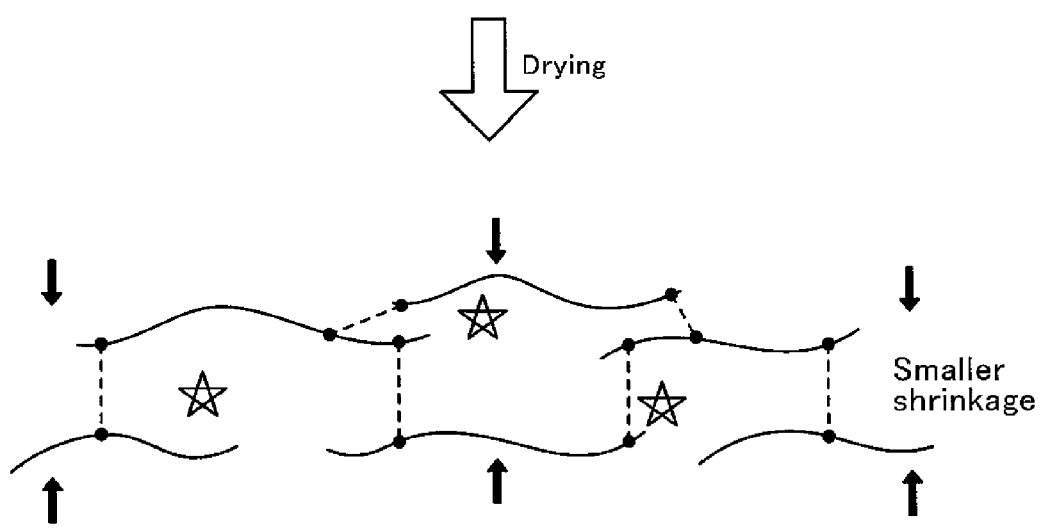

Hereinafter, the aforementioned case where urethane resin is employed as an organic binder will be described in more detail. As shown in FIGS. 2A and 2B, crosslinking occurs between adjacent molecules of the urethane resin with the progress of gelling as described above, so that urethane groups contained in the respective molecules of the urethane resin are linked to each other.

Figure 3A:
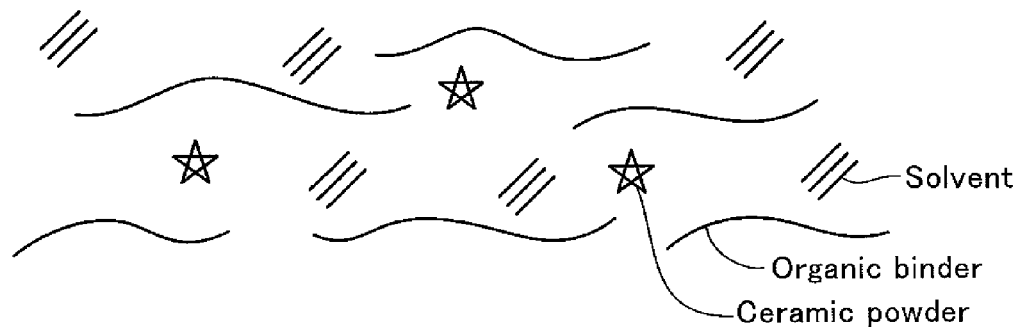
FIGS. 3A and 3B are diagrams showing a conventional ceramic green sheet before heating (i.e., before evaporation of residual solvent) and that after heating (i.e., after evaporation of residual solvent), respectively.
Figure 3B:
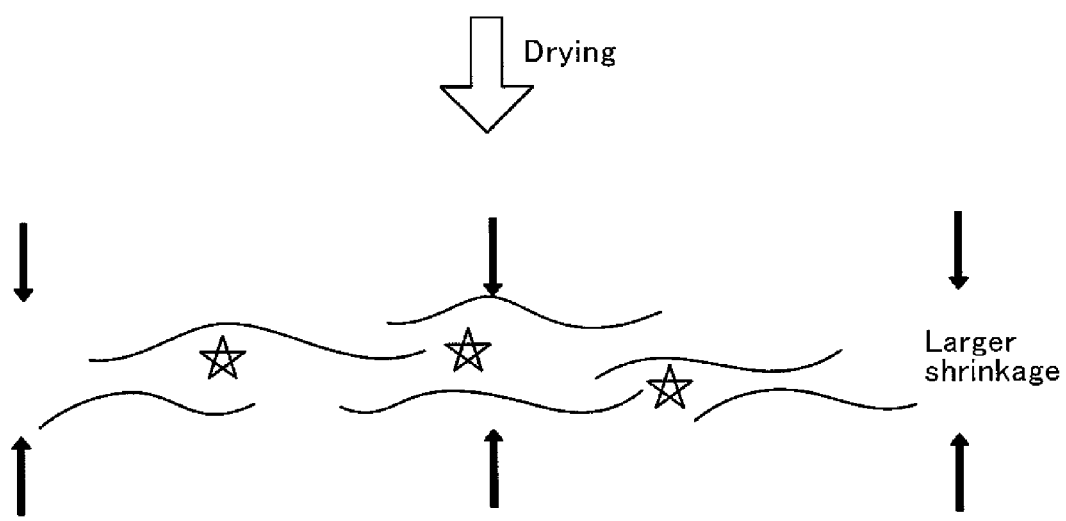

The crosslinking can form a network which links the molecules of the urethane resin. As a result, a decrease in intermolecular distance in the polyurethane resin (organic binder) contained in the sheet is suppressed, even when evaporation of residual solvent progresses in a process which involves heating. This feature is quite different from the case of the aforementioned conventional sheet shown in FIG. 3.

The shorter the distance between adjacent ones of a plurality of the urethane groups contained in the respective molecules of the urethane resin (hereinafter the distance is referred to as urethane-group distance), the denser the network. Accordingly, the sheet tends to exhibit a lower percent (heat) shrinkage and an enhanced punching property. However, the plasticity tends to decrease. In other words, the longer the urethane-group distance, the coarser the network. Accordingly, the sheet tends to exhibit a higher percent (heat) shrinkage and a deteriorated punching property. However, the plasticity tends to increase.

As shown in FIG. 1, the molecular weight of the urethane resin (hereinafter referred to as repeating-unit-based molecular weight: Mu) is defined by the following formula (1):

$$Mu=(Mi/Ri)+(Mp/Rp) \quad (1)$$

In formula (1), Mi denotes the molecular weight of an isocyanate group which is contained in an isocyanate (liquid isocyanate) used for the preparation of a slurry; Mp denotes the molecular weight of a hydroxyl group which is contained in a polyol (liquid polyol) used for the preparation of the slurry; Ri denotes the isocyanate group content of the isocyanate (liquid isocyanate) used for the preparation of the slurry; and Rp denotes the hydroxyl group content of the polyol (liquid polyol) used for the preparation of the slurry.

The repeating-unit-based molecular weight (Mu) as defined above corresponds to the molecular weight of one repeating unit in the urethane resin molecule shown in FIG. 1. Thus, the repeating-unit-based molecular weight (Mu) is a value representing the urethane-group distance and, therefore, the larger (smaller) the Mu, the longer (shorter) the urethane-group distance. In other words, with increasing (decreasing) of the repeating-unit-based molecular weight (Mu), percent (heat) shrinkage becomes larger (smaller), the punching property is more deteriorated (is more enhanced), and plasticity is more enhanced (more deteriorated).

In addition, when an excessive number of urethane resin molecules exist in the ceramic green sheet (i.e., the ratio by weight of urethane resin to ceramic powder in the ceramic green sheet is excessively large), the inter-particle distance of the ceramic powder excessively increases. Thus, the ceramic green sheet tends to exhibit an inferior sinterability during sintering. In contrast, when the ratio by weight of urethane resin to the ceramic powder in the sheet is excessively low, the inter-molecular distance between urethane resin molecules increases excessively. Thus, the binder function of the urethane resin deteriorates, so that the shape retainability after drying tends to deteriorate.

Conditions required for the ceramic green sheet to have all the required characteristics in well balance:

As described above, ceramic green sheets are required to have plasticity, punching property, and sinterability and to exhibit a low percent (heat) shrinkage, in order to facilitate subsequent processes of the sheets such as mechanical working and firing.

The present inventors' studies have revealed that a ceramic green sheet having plasticity, punching property, and sinterability and exhibiting a low percent (heat) shrinkage can be provided under the following conditions. Specifically, in the polyol and the isocyanate employed for the preparation of a slurry, the functional-group ratio of polyol to isocyanate falls within a range of 2/11.5 to 5/11.5. The repeating-unit-based molecular weight (Mu) of the urethane resin falls within a range of 290 to 988. The ratio by weight of urethane resin to ceramic powder contained in the ceramic green sheet falls within a range of 7 to 10 parts by weight of the urethane resin based on 100 parts by weight of the ceramic powder.

The above finding was confirmed by an experiment, which will be described hereunder. First, zirconia powder ($ZrO_2$; 100 parts by weight) serving as a ceramic powder, a mixture of triacetin and an organic dibasic acid ester (1:9) (20 parts by weight) serving as a solvent, and a polycarboxylic acid copolymer (3 parts by weight) serving as a dispersant were provided. These materials were mixed and ground for 12 hours by means of a ball mill, to thereby prepare a ceramic slurry precursor.

An isocyanate and a polyol were mixed with the ceramic slurry precursor (containing 100 parts by weight of the zirconia powder) such that the urethane resin produced from the isocyanate and the polyol had a repeating-unit-based molecular weight and a content (by parts by weight) shown in TABLE 1; and the functional-group ratio of polyol to isocyanate (mole ratio of hydroxyl group to isocyanate group) was adjusted to a predetermined value (e.g., 2/11.5). 4,4'-Diphenylmethane diisocyanate was used as the isocyanate, and a solution prepared by dissolving poly(vinyl butyral) (10 wt. %) in the mixture of triacetin and the organic dibasic acid ester (1:9) serving as a solvent was used as the polyol. To the prepared mixture, 6-dimethylamino-1-hexanol (0.05 parts by weight) was added as a catalyst, and the resultant mixture was degassed in vacuum, to thereby produce a ceramic slurry.

The ceramic slurry was molded into sheets having a thickness of 200 μm, by means of a sheet-forming machine employing a doctor blade. After molding, the sheets were solidified and dried by heating at 40° C. for 2 hours in the sheet-forming machine. Thereafter, the sheets were solidified and dried indoors at ambient temperature for 12 hours, to thereby produce ceramic green sheets.

The thus-produced ceramic green sheets were evaluated in terms of plasticity and punching property. Plasticity was evaluated with the ratings "pass" (O) wherein a ceramic green sheet exhibited no cracks when bent to a radius of curvature of R25, and "fail" (X) wherein a ceramic green sheet exhibited a crack under the same bending. For the evaluation of punching property, each of the ceramic green sheets was punched into rectangular sheets having a size of 0.4×3.0 mm by means of a sheet-punching machine. A cross-section of each rectangular sheet developed by punching was observed. A rectangular sheet exhibiting no cracks or crushing was evaluated as "pass" (O), and a rectangular sheet exhibiting such defects was evaluated as "fail" (X).

Separately, each ceramic green sheet was punched into square sheets having a size of 70.0×70.0 mm, by means of a sheet-punching machine. The percent heat shrinkage of the square sheet was monitored and measured for a unit time during which the sheet was heated at 80° C. When a square sheet exhibited a percent heat shrinkage of less than 0.015%, the sample was evaluated as "pass" (O), and when a square sheet exhibited a percent heat shrinkage of 0.015% or higher, the sample was evaluated as "fail" (X).

The above-described evaluations were sequentially performed on sheet samples produced from urethane resins having a repeating-unit-based molecular weight with urethane resin contents (by parts by weight) shown in TABLE 1. TABLE 1 shows the evaluation results.

TABLE 1

| Sample No. | Mol. wt. | Evaluation items | Resin 4 parts by weight | Resin 7 parts by weight | Resin 10 parts by weight | Resin 12 parts by weight |
|---|---|---|---|---|---|---|
| 1 | 170 | Plasticity | X X | X X | X X | — — |
|  |  | Punching | — | — | — | — |
|  |  | Shrinkage* | — | — | — | — |
| 2 | 290 | Plasticity | X ○ | ○ ○ | ○ ○ | — — |
|  |  | Punching | X | ○ | ○ | — |
|  |  | Shrinkage* | — | ○ | ○ | — |
| 3 | 519 | Plasticity | X ○ | ○ ○ | ○ ○ | — — |
|  |  | Punching | X | ○ | ○ | — |
|  |  | Shrinkage* | — | ○ | ○ | — |
| 4 | 988 | Plasticity | X ○ | ○ ○ | ○ ○ | — — |
|  |  | Punching | X | ○ | ○ | — |
|  |  | Shrinkage* | — | ○ | ○ | — |
| 5 | 2000 | Plasticity | X ○ | X ○ | X ○ | — — |
|  |  | Punching | X | X | X | — |
|  |  | Shrinkage* | — | — | — | — |

*Shrinkage by heat

As shown in TABLE 1, the ceramic green sheet containing 12 parts by weight of the urethane resin based on 100 parts by weight of the ceramic powder was not tested for evaluation, since the ceramic green sheet had already been found to exhibit poor (unsatisfactory) sinterability during sintering due to excessively large inter-particle distance of the ceramic powder.

As is clear from TABLE 1, the plasticity, punching property, sinterability, and percent (heat) shrinkage were satisfactory in the case where urethane resins had a repeating-unit-based molecular weight falling within a range of 290 to 988 and the ratio by weight of the urethane resin to the ceramic powder fell within a range of 7 to 10 parts by weight of the urethane resin based on 100 parts by weight of the ceramic powder.

TABLE 2 shows the results of an experiment performed for evaluation on the range of functional-group ratio of the polyol to isocyanate (i.e., a mole ratio of hydroxyl group to isocyanate group), the range being required for satisfying all of the above-described properties for the formed urethane resin having a repeating-unit-based molecular weight of 988 and a weight ratio of the urethane resin to the ceramic powder falling within a range of 7 to 10 parts by weight of the urethane resin based on 100 parts by weight of the ceramic powder.

As shown in TABLE 2, no evaluation is performed for the case where the functional group ratio was 11.5:11.5, since an excessively long drying time is required. As shown in TABLE 2, all of the above-described properties are satisfactory for the cases where the functional-group ratio of the polyol to the isocyanate falls within a range of 2/11.5 to 5/11.5. The same experiment as described above was conducted for the urethane resins having a repeating-unit-based molecular weight of 290 or 519. All of the above-described properties are sufficient when the functional-group ratio of the polyol to the isocyanate falls within a range of 2/11+5 to 5/11.5.

TABLE 2

|  |  |  | Functional-group ratio (isocyanate:polyol) | | | |
|---|---|---|---|---|---|---|
|  |  |  | 11.5:1 | 11.5:2 | 11.5:5 | 11.5:11.5 |
| Amount of resin | 7 parts | Plasticity | X | ○ ○ | ○ ○ | — — |
|  |  | Punching | X | ○ | ○ | — |
|  |  | Shrinkage* | — | ○ | ○ | — |

TABLE 2-continued

|  |  |  | Functional-group ratio (isocyanate:polyol) | | | |
|---|---|---|---|---|---|---|
|  |  |  | 11.5:1 | 11.5:2 | 11.5:5 | 11.5:11.5 |
| 8 parts | | Plasticity | X | ○ ○ | ○ ○ | — — |
|  |  | Punching | X | ○ | ○ | — |
|  |  | Shrinkage* | — | ○ | ○ | — |
| 10 parts | | Plasticity | X | ○ ○ | ○ ○ | — — |
|  |  | Punching | X | ○ | ○ | — |
|  |  | Shrinkage* | — | ○ | ○ | — |
| 11 parts | | Plasticity | — | — — | — — | — — |
|  |  | Punching | — | — | — | — |
|  |  | Shrinkage* | — | — | — | — |

*Shrinkage by heat

As described hereinabove, a ceramic green sheet having plasticity, punching property, and sinterability, all on satisfactory levels, and exhibiting a low percent (heat) shrinkage can be provided when the following conditions are satisfied: the functional-group ratio of the polyol to the isocyanate falls within a range of 2/11.5 to 5/11.5; the repeating-unit-based molecular weight of the urethane resin falls within a range of 290 to 988; and the ratio by weight of the urethane resin to the ceramic powder contained in the ceramic green sheet falls within a range of 7 to 10 parts by weight of the urethane resin based on 100 parts by weight of the ceramic powder. That is, under the above conditions, a ceramic green sheet exhibiting all the properties required for facilitating subsequent treatments of the ceramic green sheet can be provided.

Incidentally, experimental circumstances, such as method of drying, have been improved after the experiments, the evaluation results of which are shown in TABLEs 1 and 2, were conducted. Therefore, experiments similar to the experiments, the evaluation results of which are shown in TABLEs 1 and 2, have been conducted again. TABLEs 3 and 4 show the evaluation results. TABLEs 3 and 4 correspond to TABLEs 1 and 2, respectively.

TABLE 3

| Sample No. | Mol. wt. | Evaluation items | Resin 4 parts by weight | Resin 4.5 parts by weight | Resin 7 parts by weight | Resin 10 parts by weight | Resin 12 parts by weight |
|---|---|---|---|---|---|---|---|
| 1 | 170 | Plasticity | X X | X X | X X | X X | — — |
|  |  | Punching | — | — | — | — | — |
|  |  | Shrinkage* | — | — | — | — | — |
| 2 | 290 | Plasticity | X ○ | ○ ○ | ○ ○ | ○ ○ | — — |
|  |  | Punching | X | ○ | ○ | ○ | — |
|  |  | Shrinkage* | — | ○ | ○ | ○ | — |
| 3 | 519 | Plasticity | X ○ | ○ ○ | ○ ○ | ○ ○ | — — |
|  |  | Punching | X | ○ | ○ | ○ | — |
|  |  | Shrinkage* | — | ○ | ○ | ○ | — |
| 4 | 988 | Plasticity | X ○ | ○ ○ | ○ ○ | ○ ○ | — — |
|  |  | Punching | X | ○ | ○ | ○ | — |
|  |  | Shrinkage* | — | ○ | ○ | ○ | — |
| 5 | 2000 | Plasticity | X ○ | X ○ | X ○ | X ○ | — — |
|  |  | Punching | X | X | X | X | — |
|  |  | Shrinkage* | — | — | — | — | — |

*Shrinkage by heat

TABLE 4

| | | | Functional-group ratio (isocyanate:polyol) | | | | | |
|---|---|---|---|---|---|---|---|---|
| | | | 11.5:1 | 11.5:1.5 | 11.5:2 | 11.5:5 | 11.5:11.5 | 11.5:23 |
| Amount of resin | 4.5 parts | Plasticity | X ○ | ○ ○ | ○ ○ | ○ ○ | ○ ○ | — — |
|  |  | Punching | X | ○ | ○ | ○ | ○ | — |
|  |  | Shrinkage* | — | ○ | ○ | ○ | ○ | — |
|  | 7 parts | Plasticity | X ○ | ○ ○ | ○ ○ | ○ ○ | ○ ○ | — — |
|  |  | Punching | X | ○ | ○ | ○ | ○ | — |
|  |  | Shrinkage* | — | ○ | ○ | ○ | ○ | — |
|  | 8 parts | Plasticity | X ○ | ○ ○ | ○ ○ | ○ ○ | ○ ○ | — — |
|  |  | Punching | X | ○ | ○ | ○ | ○ | — |
|  |  | Shrinkage* | — | ○ | ○ | ○ | ○ | — |
|  | 10 parts | Plasticity | X ○ | ○ ○ | ○ ○ | ○ ○ | ○ ○ | — — |
|  |  | Punching | X | ○ | ○ | ○ | ○ | — |
|  |  | Shrinkage* | — | ○ | ○ | ○ | ○ | — |
|  | 11 parts | Plasticity | — — | — — | — — | — — | — — | — — |
|  |  | Punching | — | — | — | — | — | — |
|  |  | Shrinkage* | — | — | — | — | — | — |

*Shrinkage by heat

TABLE 3 is different from TABLE 1 only in an aspect that the case of 4.5 parts by weight of the urethane resin is added. The fact that the case of 4.5 parts by weight of the urethane resin is added is based on the fact that experiments for a range of 4-7 parts by weight of the urethane resin have been able to be conducted because of the improvement of the experimental circumstances. All of detailed experimental conditions except for this different point are the same as the case of the experiment, the evaluation results of which are shown in TABLE 1. Notably, a reason why an evaluation for the case of 12 parts by weight of the urethane resin was not conducted in TABLE 3 is the same as the reason described for the case of the experiment, the evaluation results of which are shown in TABLE 1.

As is clear from TABLE 3, in the experiment that has been conducted after the improvement of the experimental circumstances, the plasticity, punching property, sinterability, and percent (heat) shrinkage were satisfactory in the case where urethane resins had a repeating-unit-based molecular weight falling within a range of 290 to 988 and the ratio by weight of the urethane resin to the ceramic powder fell within a range of 4.5 to 10 parts by weight of the urethane resin based on 100 parts by weight of the ceramic powder.

TABLE 4 is different from TABLE 2 only in aspects that the case of 4.5 parts by weight of the urethane resin is added and that the cases of the functional-group ratio of the polyol to the isocyanate of 1.5/11.5 and 23/11.5 are added. The fact that the cases of the functional-group ratio of the polyol to the isocyanate of 1.5/11.5 and 23/11.5 are added is based on the fact that experiments for the functional-group ratio of the polyol to the isocyanate of a range of 1.5/11.5 to 11.5/11.5 have been able to be conducted because of the improvement of the method of drying. All of detailed experimental conditions except for these different points are the same as the case of the experiment, the evaluation results of which are shown in TABLE 2. Notably, no evaluation is performed for the case where the functional group ratio was 11.5:23, since an excessively long drying time is required.

As is clear from TABLE 4, in the experiment that has been conducted after the improvement of the experimental circumstances, all of the above-described properties are satisfactory for the cases where the functional-group ratio of the polyol to the isocyanate falls within a range of 1.5/11.5 to 11.5/11.5. The same experiment as described above was conducted for the urethane resins having a repeating-unit-based molecular weight of 290 or 519. All of the above-described properties are sufficient when the functional-group ratio of the polyol to the isocyanate falls within a range of 1.5/11.5 to 11.5/11.5.

As described hereinabove, as is clear from TABLEs 3 and 4 relative to TABLEs 1 and 2, the ranges of the conditions where all of the above-described properties are satisfactory have been expanded because of the improvement of the experiment circumstances. Specifically, a ceramic green sheet having plasticity, punching property, and sinterability, all on satisfactory levels, and exhibiting a low percent (heat) shrinkage can be provided when the following conditions are satisfied: the functional-group ratio of the polyol to the isocyanate falls within a range of 1.5/11.5 to 11.5/11.5; the repeating-unit-based molecular weight of the urethane resin falls within a range of 290 to 988; and the ratio by weight of the urethane resin to the ceramic powder contained in the ceramic green sheet falls within a range of 4.5 to 10 parts by weight of the urethane resin based on 100 parts by weight of the ceramic powder.

What is claimed is:

1. A thin ceramic green sheet which comprises a ceramic powder, and a urethane resin serving as a binder and formed by mixing an isocyanate and a polyol, wherein:
   the ratio by mole of hydroxyl group of the polyol which is employed for mixing to isocyanate group of the isocyanate which is employed for mixing falls within a range of 2/11.5 to 5/11.5;
   the urethane resin has a repeating unit-based molecular weight in a range of 290 to 988, said urethane resin repeating unit-based molecular weight being defined as the sum of a value obtained by dividing the molecular weight of an isocyanate group by the isocyanate group content of the isocyanate which is employed for mixing and a value obtained by dividing the molecular weight of a hydroxyl group by the hydroxyl group content of the polyol which is employed for mixing; and
   the ratio by weight of the urethane resin to the ceramic powder contained in the ceramic green sheet falls within a range of 7 to 10 parts by weight of the urethane resin with respect to 100 parts by weight of the ceramic powder.

2. A method for producing a thin ceramic green sheet comprising:
   mixing together a ceramic powder, an isocyanate, a polyol, and a solvent, to thereby prepare a ceramic slurry containing the ceramic powder, an unreacted portion of the isocyanate, an unreacted portion of the polyol, a urethane resin serving as a binder formed through reaction between the isocyanate and the polyol, and the solvent;
   molding the ceramic slurry into a thin sheet;
   further forming a urethane resin through reaction between the unreacted portion of the isocyanate and the unreacted portion of the polyol, the portions being contained in the molded product, to thereby solidify the molded product; and
   drying the molded product, to thereby evaporate the solvent, wherein:
   the ratio by mole of hydroxyl group of the polyol which is employed for mixing to isocyanate group of the isocyanate which is employed for mixing falls within a range of 2/11.5 to 5/11.5;
   the urethane resin has a repeating unit-based molecular weight in a range of 290 to 988, said urethane resin repeating unit-based molecular weight being defined as the sum of a value obtained by dividing the molecular weight of an isocyanate group by the isocyanate group content of the isocyanate which is employed for mixing and a value obtained by dividing the molecular weight of a hydroxyl group by the hydroxyl group content of the polyol which is employed for mixing; and
   the ratio by weight of the urethane resin to the ceramic powder contained in the ceramic green sheet falls within a range of 7 to 10 parts by weight of the urethane resin with respect to 100 parts by weight of the ceramic powder.

3. A method for producing a ceramic green sheet according to claim 2, wherein the molded product is solidified and dried through heating the product.

4. A method for producing a ceramic green sheet according to claim 2, wherein the molded product is solidified and dried through allowing the product to stand at ambient temperature.

5. A thin ceramic green sheet which comprises a ceramic powder, and a urethane resin serving as a binder and formed by mixing an isocyanate and a polyol, wherein:
   the ratio by mole of hydroxyl group of the polyol which is employed for mixing to isocyanate group of the isocyanate which is employed for mixing falls within a range of 1.5/11.5 to 11.5/11.5;
   the urethane resin has a repeating unit-based molecular weight in a range of 290 to 988, said urethane resin repeating unit-based molecular weight being defined as the sum of a value obtained by dividing the molecular weight of an isocyanate group by the isocyanate group content of the isocyanate which is employed for mixing and a value obtained by dividing the molecular weight of a hydroxyl group by the hydroxyl group content of the polyol which is employed for mixing; and
   the ratio by weight of the urethane resin to the ceramic powder contained in the ceramic green sheet falls within a range of 4.5 to 10 parts by weight of the urethane resin with respect to 100 parts by weight of the ceramic powder.

6. A method for producing a thin ceramic green sheet comprising:
   mixing together a ceramic powder, an isocyanate, a polyol, and a solvent, to thereby prepare a ceramic slurry containing the ceramic powder, an unreacted portion of the isocyanate, an unreacted portion of the polyol, a urethane resin serving as a binder formed through reaction between the isocyanate and the polyol, and the solvent;
   molding the ceramic slurry into a thin sheet;
   further forming a urethane resin through reaction between the unreacted portion of the isocyanate and the unreacted portion of the polyol, the portions being contained in the molded product, to thereby solidify the molded product; and
   drying the molded product, to thereby evaporate the solvent, wherein:
   the ratio by mole of hydroxyl group of the polyol which is employed for mixing to isocyanate group of the isocyanate which is employed for mixing falls within a range of 1.5/11.5 to 11.5/11.5;
   the urethane resin has a repeating unit-based molecular weight in a range of 290 to 988, said urethane resin repeating unit-based molecular weight being defined as the sum of a value obtained by dividing the molecular weight of an isocyanate group by the isocyanate group content of the isocyanate which is employed for mixing and a value obtained by dividing the molecular weight of a hydroxyl group by the hydroxyl group content of the polyol which is employed for mixing; and
   the ratio by weight of the urethane resin to the ceramic powder contained in the ceramic green sheet falls within a range of 4.5 to 10 parts by weight of the urethane resin with respect to 100 parts by weight of the ceramic powder.

7. A method for producing a ceramic green sheet according to claim 6, wherein the molded product is solidified and dried through heating the product.

8. A method for producing a ceramic green sheet according to claim 6, wherein the molded product is solidified and dried through allowing the product to stand at ambient temperature.

\* \* \* \* \*